United States Patent
Oh et al.

(10) Patent No.: US 11,365,126 B2
(45) Date of Patent: Jun. 21, 2022

(54) METHOD FOR MANUFACTURING AEROGEL BLANKET

(71) Applicant: LG CHEM, LTD., Seoul (KR)

(72) Inventors: Myung Eun Oh, Daejeon (KR); Se Won Baek, Daejeon (KR); Kyu Reon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/057,251

(22) PCT Filed: Dec. 13, 2019

(86) PCT No.: PCT/KR2019/017744
§ 371 (c)(1),
(2) Date: Nov. 20, 2020

(87) PCT Pub. No.: WO2020/122683
PCT Pub. Date: Jun. 18, 2020

(65) Prior Publication Data
US 2021/0198112 A1    Jul. 1, 2021

(30) Foreign Application Priority Data
Dec. 13, 2018    (KR) .................. 10-2018-0161090

(51) Int. Cl.
*C01B 33/158*    (2006.01)
*B01J 13/00*    (2006.01)
*C01B 33/143*    (2006.01)

(52) U.S. Cl.
CPC ....... *C01B 33/1585* (2013.01); *B01J 13/0091* (2013.01); *C01B 33/143* (2013.01)

(58) Field of Classification Search
CPC ................ C01B 33/1585; C01B 33/143; B01J 13/0091; C03C 25/00; C03C 25/1095; C03C 25/16; C03C 25/42
See application file for complete search history.

(56) References Cited

U.S. PATENT DOCUMENTS 10,882,750 B2 *    1/2021  Oh ..................... C01B 33/155
2001/0034375 A1    10/2001  Schwertfeger et al.
(Continued)

FOREIGN PATENT DOCUMENTS

CN    106187069    12/2016
JP    2001-504756    4/2001
(Continued)

OTHER PUBLICATIONS

Extended Search Report of European Patent Office in Appl'n No. 19896139.3, dated Oct. 8, 2021.

*Primary Examiner* — Anthony J Zimmer
*Assistant Examiner* — Logan Edward Laclair
(74) *Attorney, Agent, or Firm* — Dentons US LLP (57) ABSTRACT

Provided is a method for manufacturing an aerogel blanket having improved processability by reducing manufacturing time and cost, the method including the steps of mixing a precursor material, an acid catalyst and a hydrous alcohol to prepare a sol, depositing a substrate in the sol, and reacting with a gaseous silazane-based compound to form a gel and to perform aging and surface modification reaction simultaneously to form a wet gel blanket, and drying the wet gel blanket to manufacture an aerogel blanket.

14 Claims, 2 Drawing Sheets

(56) References Cited

U.S. PATENT DOCUMENTS

| | | |
|---|---|---|
| 2014/0150242 A1 | 6/2014 | Kratel et al. |
| 2018/0010726 A1 | 1/2018 | Kim et al. |
| 2018/0134566 A1 | 5/2018 | Kim et al. |
| 2018/0179073 A1 | 6/2018 | Oh et al. |
| 2018/0305215 A1 | 10/2018 | Kim et al. |
| 2019/0062167 A1 | 2/2019 | Kim et al. |
| 2019/0107242 A1 | 4/2019 | Kim et al. |
| 2019/0194027 A1 | 6/2019 | Kim et al. |
| 2020/0189920 A1 | 6/2020 | Kim et al. |

FOREIGN PATENT DOCUMENTS

| | | |
|---|---|---|
| JP | 2007-039323 | 2/2007 |
| JP | 2013-166667 | 8/2013 |
| JP | 2013-249215 | 12/2013 |
| JP | 2014-521579 | 8/2014 |
| KR | 10-2012-0017952 | 2/2012 |
| KR | 10-2015-0093063 | 8/2015 |
| KR | 10-2016-0100082 | 8/2016 |
| KR | 10-2016-0122634 | 10/2016 |
| KR | 10-2017-0104956 | 9/2017 |
| KR | 10-2018-0029500 | 3/2018 |
| KR | 10-2018-0029909 | 3/2018 |
| KR | 10-2018-0033064 | 4/2018 |

\* cited by examiner

FIG. 1

< PRIOR ART >

FIG. 2

METHOD FOR MANUFACTURING AEROGEL BLANKET

CROSS-REFERENCE TO RELATED APPLICATIONS

This application is a National Stage Application of International Application No. PCT/KR2019/017744, filed on Dec. 13, 2019, which claims the benefit of Korean Patent Application No. 10-2018-0161090, filed on Dec. 13, 2018, in the Korean Intellectual Property Office, the disclosures of which are incorporated herein in their entirety by reference.

TECHNICAL FIELD

The present invention relates to a method for manufacturing an aerogel blanket.

BACKGROUND

An aerogel is a superporous, high specific surface area (≥500 m$^2$/g) material having a porosity of about 90 to 99.9% and a pore size of 1 to 100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively conducted.

The biggest advantages of the aerogel are that the aerogel has super-insulation exhibiting a thermal conductivity of 0.300 W/m·K or less, which is lower than that of a conventional organic insulation material such as Styrofoam, and that fire vulnerability and the generation of harmful gases in case of occurrence of fire which are fatal weaknesses of the organic insulation material can be solved.

In general, aerogels are often applied to aerogel blankets for use, and the aerogel blankets are manufactured by a sol-gel method which undergoes a process of sol formation, wet gel formation, aging, solvent replacement, surface modification, and drying.

However, the sol-gel method that has to go through a multi-step process as described above consumes a considerable amount of time and cost. More specifically, since a large amount of solvent is required in the steps of aging and surface modification, there is an issue that the manufacturing cost rises.

Therefore, there is a need for the development of a new method that gets simple and saves the manufacturing cost to improve processability in the manufacture of an aerogel blanket.

PRIOR ART DOCUMENT

Patent Document (Patent Document 0001) Korean Patent Application Publication No. 10-2016-0100082

DISCLOSURE OF THE INVENTION

Technical Problem

An aspect of the present invention provides a method for manufacturing an aerogel blanket, the method capable of simplifying a manufacturing process than conventional manufacturing methods, thereby reducing manufacturing time and cost to improve processability.

Technical Solution

According to an aspect of the present invention, there is provided a method for manufacturing an aerogel blanket including the steps of mixing a precursor material, an acid catalyst, and a hydrous alcohol to prepare a sol, depositing a substrate in the sol and reacting with a gaseous silazane-based compound to form a gel and to perform aging and surface modification reaction simultaneously to form a wet gel blanket, and drying the wet gel blanket to manufacture an aerogel blanket.

Meanwhile, the aging may be caused by ammonia generated when the gaseous silazane-based compound reacts with the hydrous alcohol included in the sol.

In addition, the surface modification may be caused by at least one compound from the group consisting of an alkoxy silane-based compound and an alkyl silanol-based compound generated when the gaseous silazane-based compound reacts with the hydrous alcohol included in the sol.

In addition, the silazane-based compound may be a compound represented by Formula 1 below.

Formula 1

In Formula 1 above, $R_1$ and $R_3$ may be each independently an alkyl group having 1 to 8 carbon atoms, $R_2$ and $R_4$ may be each independently a hydrogen atom or an alkyl group having 1 to 8 carbon atoms, and n and m may be each independently an integer of 1 to 3.

In addition, the gaseous silazane-based compound may be at least one compound selected from the group consisting of hexaalkyldisilazane and tetraalkyldisilazane, and of those, may include hexamethyldisilazane (HMDS).

In this case, the gaseous silazane-based compound may be supplied in an amount of 2.5 parts by weight to 4.2 parts by weight with respect to 100 parts by weight of the sol.

For example, the hydrous alcohol may be at least one selected from the group consisting of hydrous methanol, hydrous ethanol, hydrous isopropanol, hydrous butanol, hydrous glycerol, hydrous ethylene glycol, hydrous propylene glycol, hydrous diethylene glycol, hydrous dipropylene glycol, and hydrous sorbitol.

In another example, the acid catalyst may be at least one inorganic acid selected from the group consisting of nitric acid, hydrochloric acid, acetic acid, sulfuric acid, and hydrofluoric acid.

Meanwhile, in the step of forming the wet gel blanket, an organic solvent may not be added for use.

For example, the hydrous alcohol solvent may be included in an amount of 60 parts by weight to 99 parts by weight with respect to 100 parts by weight of the silica sol.

Meanwhile, the step of a gelation reaction may be performed at a temperature of 50° C. to 75° C.

In this case, the step of the gelation reaction may be performed for 2 hours to 5 hours.

Advantageous Effects

A method for manufacturing an aerogel blanket according to the present invention uses a gaseous silazane-based compound to skip the steps of separate aging or surface modification caused by ammonia, alkoxy silane-based compounds and alkyl silanol-based compounds generated during the reaction, such as trimethyl ethoxy silane (TMES) and trimethyl silanol (TMS), thereby simplifying the process. Meanwhile, in general, when going through the aging or surface modification steps, an organic solvent is additionally used but since the steps above are not performed separately, there is no need to additionally use solvents and surface modifiers, thereby reducing the manufacturing cost.

DETAILED DESCRIPTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for manufacturing an aerogel blanket according to the present invention includes the steps of (1) preparing a sol, (2) depositing a substrate in the sol and then reacting with a gaseous silazane-based compound to form a gel and to perform aging and surface modification reaction simultaneously to form a wet gel blanket, and (3) drying the wet gel blanket to manufacture an aerogel blanket. Hereinafter, each step will be described in order.

(1) Step of Preparing a Sol

A sol according to an embodiment of the present invention is not limited as long as the sol is a material capable of forming a porous gel by a sol-gel reaction, and specifically, may include an inorganic sol, an organic sol, or a combination thereof. The inorganic sol may include zirconia, yttrium oxide, hafnia, alumina, titania, ceria, silica, magnesium oxide, calcium oxide, magnesium fluoride, calcium fluoride, and combinations thereof, and the organic sol may include polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurate, polyacrylamides, various epoxies, agar, agarose, and combinations thereof. In order to ensure excellent miscibility with the blanket substrate, to further improve porosity when forming a gel, and to manufacture an aerogel blanket having low thermal conductivity, the sol may be preferably a silica sol.

When a catalyzed sol according to an embodiment of the present invention is a catalyzed silica sol, the silica sol is prepared by mixing a silica precursor, an acid catalyst, and a hydrous alcohol.

Specifically, the silica precursor may be a silicon-containing alkoxide-based compound, for example, tetraalkyl orthosilicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate.

The silica precursor may be used such that the content of silica ($SiO_2$) is 0.1 parts by weight to 30.0 parts by weight with respect to 100 parts by weight of the prepared silica sol. When the content of the silica is within the above range, an aerogel blanket having excellent thermal insulation performance and maintaining mechanical properties above a certain level can be manufactured.

Meanwhile, any acid may be used as the acid catalyst as long as the acid can cause an oxidation reaction to promote the hydration reaction of the silica precursor, and specifically, at least one inorganic acid such as nitric acid, hydrochloric acid, acetic acid, sulfuric acid, and hydrofluoric acid may be used. However, it is not limited to those listed above.

In addition, the hydrous alcohol is used to adjust the hydrophobizing degree of the finished silica aerogel blanket while promoting the surface modification reaction.

In addition, the hydrous alcohol adjusts silica density in the silica sol, and serves to decompose the gaseous silazane-based compound into ammonia, an alkoxy silane-based compound, and an alkyl silanol-based compound. For example, when the gaseous silazane-based compound is gaseous hexamethyldisilazane, the hydrous alcohol may serve to decompose the hexamethyldisilazane into ammonia, trimethyl ethoxy silane (TEMS), and trimethyl silanol (TMS).

The hydrous alcohol is specifically a monohydric alcohol such as hydrous methanol, hydrous ethanol, hydrous isopropanol, and hydrous butanol, or a polyhydric alcohol such as hydrous glycerol, hydrous ethylene glycol, hydrous propylene glycol, hydrous diethylene glycol, hydrous dipropylene glycol, and hydrous sorbitol, and any one or a mixture of two or more thereof may be used. Among them, considering miscibility with water and aerogels, it may be a monohydric alcohol having 1 to 6 carbon atoms such as hydrous methanol, hydrous ethanol, hydrous isopropanol, and hydrous butanol.

In this case, when the hydrous alcohol is included in an amount of 60 parts by weight to 99 parts by weight, more preferably 70 parts by weight to 99 parts by weight with respect to 100 parts by weight of the sol, in the step (2) below, the hydrous alcohol fully reacts with the gaseous silazane-based compound to form ammonia, trimethyl ethoxy silane (TMES), trimethyl silanol (TMS), etc.

(2) Step of Forming a Wet Gel Blanket

The step of forming a wet gel blanket is performed by depositing a substrate in the sol prepared in step (1) and then reacting with the gaseous silazane-based compound to form a gel and to perform aging and surface modification simultaneously. The wet gel blanket according to an embodiment of the present invention may refer to a substrate on which a gel is formed by gelling the sol impregnated in the substrate, and specifically, may refer to a composite of the wet gel and the blanket substrate.

Figure 1:
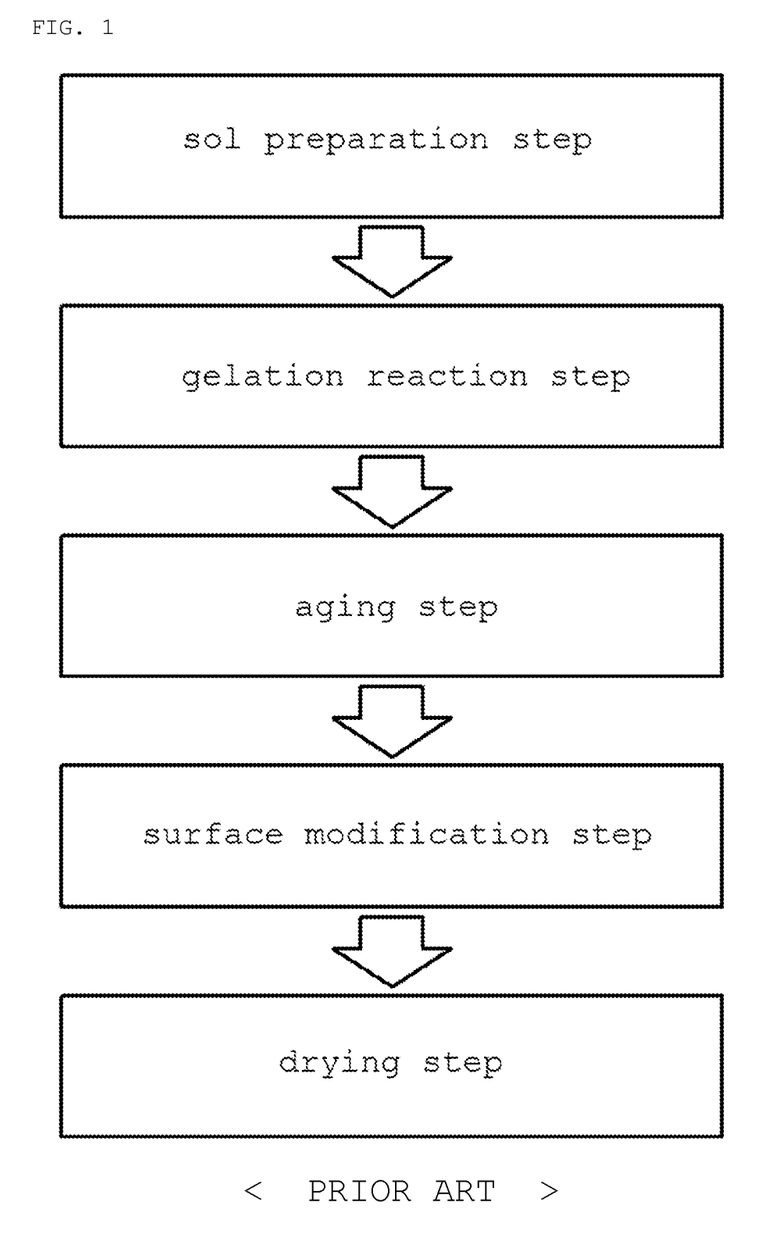
FIG. 1 is a flow chart of a method for manufacturing an aerogel blanket according to the prior invention.

According to the conventional method for manufacturing an aerogel blanket, as described in FIG. 1, after gelling the sol, separate aging and surface modification steps should be additionally performed, and then lastly a supercritical drying step should be carried out. Accordingly, there is an issue that the manufacturing process takes long due to multiple steps, and thus economic feasibility of the process is deteriorated. Meanwhile, in order to perform aging and surface modification, an organic solvent such as alcohol must be additionally used in addition to the hydrous alcohol in the sol, and surface modifiers must be additionally used in the surface modification step, thus the manufacturing cost is also high to have a limitation in commercialization.

In the step of forming a wet gel blanket of the present invention, ammonia ($NH_3$), an alkoxy silane-based compound, and an alkyl silanol-based compound, for example, ammonia, trimethyl ethoxy silane (TMES), trimethyl silanol (TMS), etc. are generated by the reaction between the gaseous silazane-based compound and the hydrous alcohol. Therefore, when the sol and the gaseous silazane-based compound react, both gel formation, and aging and surface modification reactions are performed simultaneously to form a wet gel blanket in one step. In addition, according to the present invention, an organic solvent is not additionally used in the step of forming the wet gel blanket, so that the manufacturing cost is reduced to improve processability.

Figure 2:
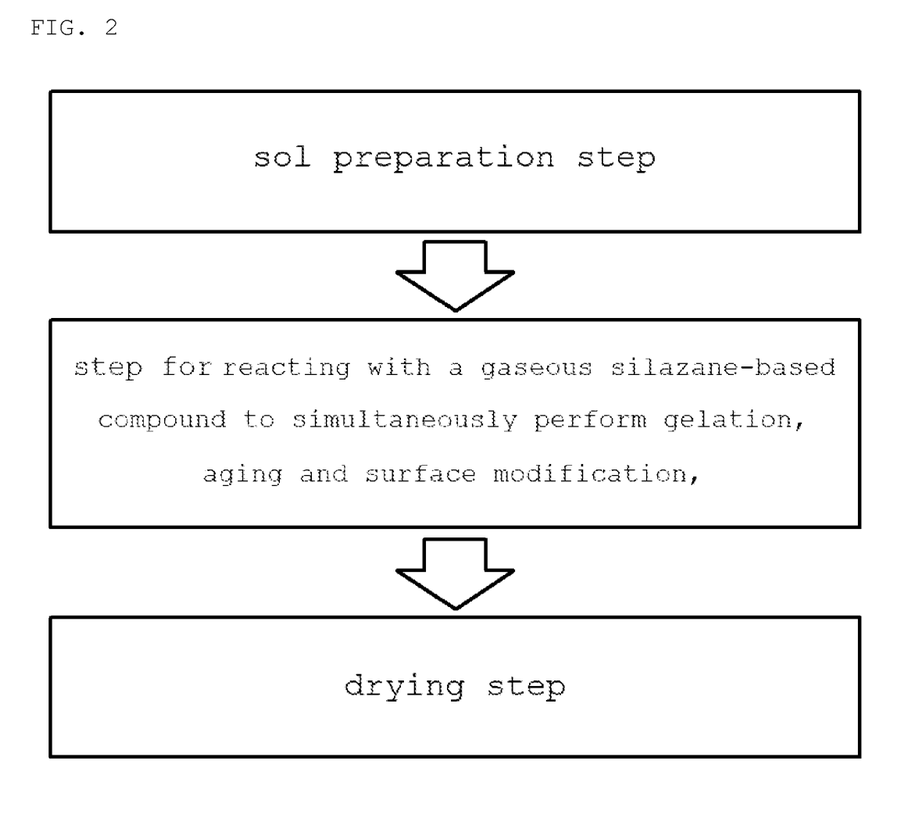
FIG. 2 is a flow chart of a method for manufacturing an aerogel blanket according to the present invention.

Therefore, unlike the conventional manufacturing method, the method for manufacturing an aerogel blanket of the present invention as shown in FIG. 2 can have the same effect as going through the above steps without undergoing the aging and surface modification steps separately to simplify the manufacturing process and also reduce the manufacturing cost.

First, a substrate is deposited in the sol prepared by the step (1). Specifically, the deposition may be performed in a reaction vessel capable of accommodating the substrate, and may be performed by pouring the sol into the reaction vessel or by soaking or impregnating the substrate in the reaction vessel containing the sol.

Meanwhile, the substrate may be in the form of a film, sheet, net, fiber, porous body, foam, nonwoven fabric, or a laminate of two or more thereof. In addition, depending on the use, the surface roughness may be formed or patterned. More specifically, the substrate may be a fiber having an improved thermal insulation performance by including spaces or voids to facilitate the insertion of a silica aerogel.

Specifically, the material of the substrate may be polyamide, polybenzimidazole, polyaramid, acrylic resin, phenol resin, polyester, polyether ether ketone (PEEK), polyolefin (e.g., polyethylene, polypropylene, or copolymers thereof), cellulose, carbon, cotton, wool, hemp, nonwoven fabric, glass fiber, ceramic wool, etc.

The substrate is deposited in the sol and reacted with a gaseous silazane-based compound. Specifically, the liquid silazane-based compound is contained in a separate container from the reaction vessel containing the substrate deposited in the sol, and the respective containers are sealed together, and then the temperature is raised to vaporize the liquid silazane-based compound so that a method of reacting with a gaseous silazane-based compound can be used. Alternatively, the substrate may be deposited in the sol, sealed, and then supplied with a gaseous silazane-based compound, or may be reacted by adding a substrate deposited in a silica sol in a reaction vessel containing only the gaseous silazane-based compound. However, the method of reaction is not limited by a specific method.

According to an embodiment of the present invention, the silazane-based compound may be specifically a silazane-based compound including two or more alkyl groups in one molecule, and more specifically, may be a compound of Formula 1 below:

Formula 1

In Formula 1 above, $R_1$ and $R_3$ may be each independently an alkyl group having 1 to 8 carbon atoms, $R_2$ and $R_4$ may be each independently a hydrogen atom or an alkyl group having 1 to 8 carbon atoms, and n and m may be each independently an integer of 1 to 3.

Specific examples of the silazane-based compound may be 1,3-diethyldisilazane, 1,1,3,3-tetramethyl disilazane, 1,1,3,3-tetraethyl disilazane, 1,1,1,3,3,3-hexamethyldisilazane (HMDS), 1,1,1,3,3,3-hexaethyl-disilazane, 1,1,3,3-tetraethyldisilazane, or 1,3-diisopropyldisilazane, and among them, one or a mixture of two or more may be used.

Among these, the silazane-based surface modifier may be, along with two hydrogen atoms in the silazane-based compound of Formula 1 above, tetraalkyldisilazane including four alkyl groups having 1 to 4 carbon atoms or hexaalkyldisilazane including six alkyl groups having 1 to 4 carbon atoms, more specifically hexamethyldisilazane (HMDS) or tetramethyldisilazane to further increase hydrophobicity of the aerogel.

Meanwhile, when the gaseous silazane-based compound reacts with the substrate on which the sol is deposited, the hydrous alcohol included in the sol, specifically, the silica sol, and the gaseous silazane-based compound react to generate ammonia ($NH_3$). In this case, aging is performed simultaneously together with a gelation reaction simultaneously due to the ammonia generated when the gaseous silazane-based compound reacts with the hydrous alcohol included in the sol.

In addition, by the reaction, at least one compound may be generated from the group consisting of an alkoxy silane-based compound and an alkyl silanol-based compound. Specifically, when the silazane-based compound is hexamethyldisilazane, at least one compound may be generated from the group consisting of trimethyl ethoxy silane (TMES) and trimethyl silanol (TMS).

Accordingly, the gelation reaction, the aging, and the surface modification are performed simultaneously due to the compound such as the alkoxy silane-based compound and the alkyl silanol-based compound generated when the gaseous silazane-based compound reacts with the hydrous alcohol contained in the sol, specifically trimethyl ethoxy silane (TMES), trimethyl silanol (TMS), etc.

Meanwhile, the alkoxy silane-based compound and the alkyl silanol-based compound are materials used as surface modifiers when manufacturing a conventional aerogel blanket. That is, the material that uses the silazane-based compound of the present invention as a surface modifier may be a precursor material. In the gelation reaction according to the present invention, the surface of the aerogel, specifically the surface of the silica aerogel may be hydrophobically modified by a compound such as an alkoxy silane-based compound decomposed from the silazane-based compound without going through the surface modification step by adding a separate surface modifier. When the surface is modified as described above, the silanol group (Si—OH) on the surface of the silica absorbs moisture in the air, thereby preventing the issue of increasing the thermal conductivity of the aerogel blanket.

In this case, the gaseous silazane-based compound may be supplied in an amount of 2.5 parts by weight to 4.2 parts by weight, preferably 2.9 parts by weight to 4.2 parts by weight, more preferably 3.4 parts by weight to 4.2 parts by weight, with respect to 100 parts by weight of the silica sol. When the silazane-based compound is used within the above range, an aerogel blanket having excellent thermal insulation performance and maintaining mechanical properties above a certain level can be manufactured.

When using the gaseous silazane-based compound according to an embodiment of the present invention, since no solvent is required, raw material cost can be reduced, and since an organic solvent generally used for surface modification is not used, it is effective in an environmentally friendly aspect. In addition, the surface modification efficiency may be further improved as compared with using a liquid silazane-based compound.

Specifically, in order to ensure excellent hydrophobicity of the aerogel blanket, it is important to make the surface modification uniform throughout the wet gel blanket and this can be realized when evenly dispersing active ingredients of the surface modification (hereinafter referred to as surface modifier) on the surface and inside of the wet gel blanket. When using a gaseous silazane-based compound as an embodiment of the present invention, the surface modifier is well dispersed on the surface and inside of the wet gel blanket formed by gelation due to the inherent property of gas having excellent diffusivity, and thus the manufactured aerogel blanket can have a uniform hydrophobicity throughout. However, when using a liquid silazane-based compound, the surface modifier solution is required in a volume sufficient to contain the entire wet gel blanket formed by gelation in order to evenly disperse the surface modifier throughout the wet gel blanket, and typically, the compound is diluted in a solvent to meet the required volume. As such, when the liquid silazane-based compound is used, the cost of raw material increases because an additional solvent is required, and the type generally used as a solvent is an organic solvent, which may be undesirable in terms of the environment. In addition, when the silazane-based compound is diluted in a solvent and used, the surface modification efficiency is relatively inferior to that of the gaseous silazane-based compound due to the presence of the solvent and when the surface modification is performed with the same amount of the silazane-based compound, the surface modification takes longer by using the liquid silazane-based compound solution (diluent), and thus the efficiency is greatly deteriorated. In this case, in order to shorten the surface modification time, an excess amount of silazane-based compound should be used to increase the concentration of the surface modifier solution, which results in a waste of relatively expensive silazane-based compound. That is, in order to obtain the maximum efficiency in surface modification reaction with respect to the amount of silazane-based compound used, the application of the gaseous silazane-based compound is preferable.

Here, the surface modifier may refer to an alkoxy silane-based compound and/or an alkyl silanol-based compound generated as a result of the decomposition reaction of the silazane-based compound in the present invention, and that may be a material that serves as an active ingredient in the surface modification reaction.

In addition, when the liquid silazane-based compound is used as it is without adding an additional diluent solvent other than the liquid silazane-based compound, as described above, an excess amount of the compound is required to sink the wet gel blanket formed by gelation and accordingly, excessive use of a relatively expensive silazane-based compound come inevitable, which is not economically feasible. In addition, the excessive use causes an increase in the concentration of the silazane-based compound in the reaction mixture, and the silazane-based compound of high concentration may be a factor that prevents the condensation reaction between precursor materials from being easily performed, causing longer time of gelation or failure of gelation itself for the worse.

Furthermore, when the sol deposited on the substrate is reacted with a liquid silazane-based compound diluted in a solvent to simultaneously perform gelation, aging, and surface modification, gelation is performed not only on the surface and inside of the substrate but also in the entire reaction mixture solution other than the substrate to form a wet gel monolith. That is, since only the substrate is simply included in the wet gel of the monolith and the wet gel is not only formed on the inside or surface of the substrate, the silica concentration of the wet gel in the blanket is remarkably low when the wet gel blanket is collected from the entire wet gel monolith, which may cause deterioration of physical properties such as thermal conductivity and hydrophobicity, and since most of the wet gels which are not in contact with the blanket are discarded, raw materials such as precursors and silazane-based compounds are wasted.

In addition, since a gel is formed not only on the substrate but also on the total volume of the reaction mixture solution including the sol and silazane-based compound diluent, an aerogel blanket having desired specification cannot be stably manufactured and there is an issue that it is not easy to control the specification of the aerogel blanket, which is the final product only by the substrate specification, and in order to secure the aerogel blanket having desired specification, an additional process such as a separate cutting process must be accompanied, and thus the process efficiency may be deteriorated.

Meanwhile, the step of forming the wet gel blanket may be performed at a temperature of 50° C. to 75° C., preferably 55° C. to 75° C., more preferably 60° C. to 75° C. When the step of forming the wet gel blanket is performed within the above temperature range, the gaseous silazane-based compound may be supplied so as not to delay the time that the gel is formed by adjusting the vaporization rates of the hydrous alcohol and the liquid silazane-based compound. In addition, when the step of forming the wet gel blanket is performed within the above temperature range, aging and surface modification reaction may be performed simultaneously.

In this case, the step of forming the wet gel blanket may be performed for 2 hours to 5 hours. In the present invention, unlike the conventional aerogel blanket manufacturing method, separate aging and surface modification steps are not needed. Therefore, when compared with the sum of the time for each step required for the conventional three steps, the overall process time can also be shortened.

In addition, in the wet gel blanket according to an embodiment of the present invention, the step of drying after formation may be further performed.

The step of drying according to an embodiment of the present invention may be performed through a process of removing a solvent while maintaining the pore structure of the aged gel as it is, and the step of drying may be carried out by a supercritical drying or atmospheric pressure drying process. Alternatively, in the step of drying, both a supercritical drying and atmospheric pressure drying may be performed sequentially.

The supercritical drying process may be performed using supercritical carbon dioxide. Carbon dioxide ($CO_2$) is a gaseous state at room temperature and atmospheric pressure, but when it exceeds a certain temperature and high pressure limit called the supercritical point, it does not evaporate and becomes a critical state in which gas and liquid are not distinguished and the carbon dioxide in this critical state is called supercritical carbon dioxide.

Supercritical carbon dioxide has a molecular density close to liquid but has low viscosity close to gas, and has high drying efficiency due to fast diffusion and high thermal conductivity, and can shorten drying process time.

Specifically, in the supercritical drying process, the aged wet gel blanket is put into a supercritical drying reactor, and then a solvent replacement process is performed to fill the liquid $CO_2$ and replace the alcohol solvent in the wet gel with $CO_2$. Thereafter, the temperature is raised to 40° C. to 70° C. at a constant temperature increase rate, specifically 0.1° C./min to 1° C./min, and then pressure above the pressure at which carbon dioxide becomes a supercritical state, specifically, 100 bar to 150 bar is maintained for a predetermined time, specifically 20 minutes to 1 hour, in the supercritical state of carbon dioxide. In general, carbon dioxide becomes a supercritical state at a temperature of 31° C. and a pressure of 73.8 bar. It is maintained for 2 to 12 hours, more specifically for 2 to 6 hours at a constant temperature and a constant pressure at which carbon dioxide becomes a supercritical state and then gradually depressurized to complete the supercritical drying process to manufacture an aerogel blanket.

In addition, the atmospheric pressure drying process may be performed at a temperature of 70° C. to 200° C. and atmospheric pressure (1±0.3 atm) according to a conventional method such as hot air drying, IR drying, etc.

As a result of the drying process as described above, a blanket including a porous aerogel having nano-sized pores can be manufactured. In particular, the silica aerogel according to an embodiment of the present invention has excellent physical properties, particularly low tap density and high porosity along with high hydrophobicity and the silica aerogel-containing blanket including the same has excellent mechanical flexibility together with low thermal conductivity.

In addition, before or after the drying process, a pressing process to adjust thickness and to make the internal structure and surface shape of the blanket uniform, a molding process to ensure proper shape or morphology depending on the use, or a lamination process to laminate separate functional layers may be further performed.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

1. Example 1

A hydrochloric acid solution (concentration=0.15%) diluted in water was added to a mixed solution prepared by mixing tetraethylorthosilicate (TEOS) and hydrous ethanol in a weight ratio of 3:1 (silica content=4 wt %) so that the pH of the mixed solution became 1, and then mixed to produce a silica sol. After a glass fiber was deposited in the prepared silica sol, a gaseous hexamethyldisilazane was placed into a closed container having 4.2 parts by weight with respect to 100 parts by weight of the silica sol to form a wet gel blanket at 70° C. for 5 hours. The wet gel blanket was placed in a supercritical extractor of 7.2 L and $CO_2$ was injected. Thereafter, the temperature in the extractor was raised to 60° C. over the period of 1 hour, and supercritical drying was performed at 50° C. and 100 bar. Thereafter, $CO_2$ was vented over the period of 2 hours, and additionally atmospheric drying was performed in an oven at 150° C. to manufacture an aerogel blanket.

2. Example 2

An aerogel blanket was manufactured in the same manner as used in Example 1, except that the step of forming a wet gel blanket was performed at 70° C. for 3 hours.

3. Example 3

An aerogel blanket was manufactured in the same manner as used in Example 1, except that the step of forming a wet gel blanket was performed at 50° C.

4. Example 4

An aerogel blanket was manufactured in the same manner as used in Example 1, except that the gaseous hexamethyldisilazane was reduced to 60 parts by weight compared to Example 1 and then supplied into a closed container.

5. Example 5

An aerogel blanket was manufactured in the same manner as used in Example 1, except that the gaseous hexamethyldisilazane was reduced to 50 parts by weight compared to Example 1 and then supplied into a closed container.

COMPARATIVE EXAMPLES

1. Comparative Example 1

A hydrochloric acid solution (concentration=0.15%) diluted in water was added to a mixed solution prepared by mixing tetraethylorthosilicate (TEOS) and hydrous ethanol in a weight ratio of 3:1 (silica content=4 wt %) so that the pH of the mixed solution became 1, and then mixed to produce a silica sol. Thereafter, an ammonia catalyst was added to the silica sol in an amount of 0.5% by volume to initiate gelation and then a glass fiber was deposited to prepare a silica wet gel composite. The produced silica wet gel composite was left in an ethanol solution at a temperature of 70° C. for 1 hour to be aged. Then, a surface modifier solution prepared by mixing hexamethyldisilazane and ethanol in a volume ratio of 1:19 was added in an amount of 90% by volume with respect to the wet gel and surface modification was performed at 70° C. for 4 hours to prepare a hydrophobic silica wet gel composite. The hydrophobic silica wet gel composite was placed in a supercritical extractor of 7.2 L and $CO_2$ was injected. Thereafter, the temperature in the extractor was raised to 60° C. over the period of 1 hour, and supercritical drying was performed at 50° C. and 100 bar. Then, $CO_2$ was vented over the period of 2 hours and additionally atmospheric drying was performed in an oven at 150° C. to manufacture an aerogel blanket.

2. Comparative Example 2

An aerogel blanket was manufactured in the same manner as used in Comparative Example 1, except that the surface modification was performed at 70° C. for 2 hours.

3. Comparative Example 3

An aerogel blanket was manufactured in the same manner as used in Comparative Example 1, except that the surface modifier solution was prepared using hexamethyldisilazane reduced to 60 parts by weight compared to Comparative Example 1.

4. Comparative Example 4

An aerogel blanket was manufactured in the same manner as used in Comparative Example 1, except that the surface modifier solution was prepared using hexamethyldisilazane reduced to 50 parts by weight compared to Comparative Example 1.

5. Comparative Example 5

An aerogel blanket was manufactured in the same manner as used in Example 1, except that a glass fiber deposited with silica sol was added to a solution prepared by mixing liquid hexamethyldisilazane and ethanol in a volume ratio of 1:19 instead of a gaseous hexamethyldisilazane. In this case, hexamethyldisilazane is included in an amount of 4.2 parts by weight with respect to 100 parts by weight of the silica sol.

EXPERIMENTAL EXAMPLE

The physical properties of Examples 1 to 6 and Comparative Examples 1 to 5 were measured, and the results are shown in Table 1 below. Meanwhile, in Comparative Example 5, gelation was performed with respect to the total volume of the reactants including the sol and the surface modification solution to prepare an aerogel monolith, and only the aerogel blanket was separately collected to measure physical properties.

1) Room Temperature Thermal Conductivity (mW/mK, 25° C.)

The room temperature thermal conductivity of the aerogel blankets manufactured in Examples and Comparative Examples was measured by using HFM 436 from NETZSCH.

2) Measurement of Moisture Impregnation Rate (hydrophobicity) (wt %)

100 mm×100 mm sized specimens were prepared using silica aerogel blankets prepared in Examples and Comparative Examples, floated on distilled water of 21±2° C., and the mesh screen was impregnated to 127 mm below the water surface (impregnation). After 15 minutes, the mesh screen was removed, and when the specimen floated, the specimen was picked up by a clamp and suspended vertically for 60±5 seconds. Then, the weight of the specimen before and after the impregnation was measured respectively, the weight increase rate was calculated by Equation 1 below and this is defined as a moisture impregnation rate.

Weight increase rate (=moisture impregnation rate, wt %)={(weight of specimen after impregnation-weight of specimen before impregnation)/(weight of specimen before impregnation)}×100 wt %     <Equation 1>

TABLE 1

|  | Thermal conductivity (mW/mK) | Moisture impregnation rate (wt %) |
| --- | --- | --- |
| Example 1 | 17.3 | 0.8 |
| Example 2 | 17.6 | 1.3 |
| Example 3 | 17.7 | 1.3 |
| Example 4 | 17.6 | 1.4 |
| Example 5 | 18.2 | 2.8 |

TABLE 1-continued

|  | Thermal conductivity (mW/mK) | Moisture impregnation rate (wt %) |
| --- | --- | --- |
| Comparative Example 1 | 17.5 | 1.5 |
| Comparative Example 2 | 19.2 | 3.2 |
| Comparative Example 3 | 19.5 | 3.4 |
| Comparative Example 4 | 22.8 | 6.9 |
| Comparative Example 5 | 27.4 | 2.0 |

As shown in Table 1 above, it can be confirmed that Examples have excellent thermal insulation performance due to low thermal conductivity even without going through surface modification or aging compared to Comparative Examples. In addition, it can be confirmed that Examples have lower water impregnation rate to have high water repellency compared to Comparative Examples.

Among them, Comparative Example 5 was manufactured as an aerogel monolith having a substrate inside instead of the aerogel blanket, and thus, a process of separately collecting the aerogel blanket from the aerogel monolith was required to measure physical properties and since all aerogels that were not included in the surface and inside of the blanket were discarded, the ratio of silica aerogel in the aerogel blanket was remarkably lower than that of other Examples and Comparative Examples to confirm that the thermal conductivity and the moisture impregnation rate were greatly deteriorated.

The invention claimed is:

1. A method for manufacturing an aerogel blanket, the method comprising:
   mixing a precursor material, an acid catalyst, and a hydrous alcohol to prepare a sol;
   forming a wet gel blanket by depositing a substrate in the sol and reacting the sol with a silazane-based compound in a gaseous state in a sealed reaction vessel to form a gel and to perform aging and surface modification reaction simultaneously; and
   drying the wet gel blanket to manufacture the aerogel blanket.

2. The method of claim 1, wherein the aging is performed in the presence of ammonia generated when the gaseous silazane-based compound reacts with the hydrous alcohol included in the sol.

3. The method of claim 1, wherein the silazane-based compound is a compound represented by Formula 1 below:

Formula 1 wherein in Formula 1 above,
$R_1$ and $R_3$ are each independently an alkyl group having 1 to 8 carbon atoms,
$R_2$ and $R_4$ are each independently a hydrogen atom or an alkyl group having 1 to 8 carbon atoms, and
n and m are each independently an integer of 1 to 3.

4. The method of claim 1, wherein the silazane-based compound comprises any one compound or a mixture of two or more compounds selected from the group consisting of tetraalkyldisilazane and hexaalkyldisilazane, and the alkyl is an alkyl group having 1 to 4 carbon atoms.

5. The method of claim 1, wherein the silazane-based compound comprises hexamethyldisilazane (HMDS).

6. The method of claim 1, wherein the surface modification is performed by at least one compound selected from the group consisting of an alkoxy silane-based compound and an alkyl silanol-based compound generated when the silazane-based compound in a gaseous state reacts with the hydrous alcohol included in the sol.

7. The method of claim 1, wherein the silazane-based compound in a gaseous state is supplied in an amount of 2.5 parts by weight to 4.2 parts by weight with respect to 100 parts by weight of the sol.

8. The method of claim 1, wherein the hydrous alcohol comprises one selected from the group consisting of hydrous methanol, hydrous ethanol, hydrous isopropanol, hydrous butanol, hydrous glycerol, hydrous ethylene glycol, hydrous propylene glycol, hydrous diethylene glycol, hydrous dipropylene glycol, and hydrous sorbitol.

9. The method of claim 1, wherein the sol is a silica sol.

10. The method of claim 1, wherein the acid catalyst comprises one inorganic acid selected from the group consisting of nitric acid, hydrochloric acid, acetic acid, sulfuric acid, and hydrofluoric acid.

11. The method of claim 1, wherein in the step of forming the wet gel blanket, no additional organic solvent is used.

12. The method of claim 1, wherein the hydrous alcohol is contained in an amount of 60 parts by weight to 99 parts by weight with respect to 100 parts by weight of the sol.

13. The method of claim 1, wherein the forming of the wet gel blanket is performed at a temperature of 50° C. to 75° C.

14. The method of claim 1, wherein the forming of the wet gel blanket is performed for 2 hours to 5 hours.

* * * * *